United States Patent
Hagen

(10) Patent No.: US 10,189,394 B2
(45) Date of Patent: *Jan. 29, 2019

(54) VEHICLE GUTTER SPOUT COVER

(71) Applicant: Michael P. Hagen, Tolland, CT (US)

(72) Inventor: Michael P. Hagen, Tolland, CT (US)

(*) Notice: Subject to any disclaimer, the term of this patent is extended or adjusted under 35 U.S.C. 154(b) by 0 days.

This patent is subject to a terminal disclaimer.

(21) Appl. No.: 15/822,511

(22) Filed: Nov. 27, 2017

(65) Prior Publication Data

US 2018/0118083 A1 May 3, 2018

Related U.S. Application Data

(63) Continuation of application No. 15/341,255, filed on Nov. 2, 2016, now Pat. No. 9,855,881.

(51) Int. Cl.
*B60P 3/36* (2006.01)
*B60R 13/07* (2006.01)
*B60J 11/04* (2006.01)

(52) U.S. Cl.
CPC ............ *B60P 3/36* (2013.01); *B60J 11/04* (2013.01); *B60R 13/07* (2013.01)

(58) Field of Classification Search
CPC ............ B60P 3/36; B60J 11/04; B60R 13/07
See application file for complete search history.

(56) References Cited

U.S. PATENT DOCUMENTS

| 4,027,880 A * | 6/1977 | Hadtke | A63B 43/007 |
| | | | 473/426 |
| 4,643,471 A * | 2/1987 | Fishback | B60J 11/06 |
| | | | 280/770 |
| 2009/0011869 A1* | 1/2009 | Bozof | A63B 69/0088 |
| | | | 473/424 |

OTHER PUBLICATIONS http:www.outbackers.com/forums/index.php?showtopic=35197 Outbackers Forum, Oct. 14, 2012 (Year: 2012).*

* cited by examiner

*Primary Examiner* — Hilary L Gutman
(74) *Attorney, Agent, or Firm* — Michael A. Blake

(57) ABSTRACT

A vehicle gutter spout cover comprising: a receptacle with a generally smooth outside surface; an orifice located on the receptacle and configured to allow the receptacle to slide over and enclose at least a portion of a gutter spout; and an adjustable length connecting means attached to the receptacle. A vehicle gutter spout cover system comprising: a vehicle; at least one gutter located on the vehicle; at least one gutter spout in fluid communication with the gutter; a receptacle with a generally smooth outside surface; an orifice located on the receptacle and configured to allow the receptacle to slide over and enclose at least a portion of the gutter spout; an adjustable length connecting means attached to the receptacle; and a vehicle cover configured to cover a vehicle and the gutter spout, with the receptacle generally enclosing at least a portion of the gutter spout.

4 Claims, 5 Drawing Sheets

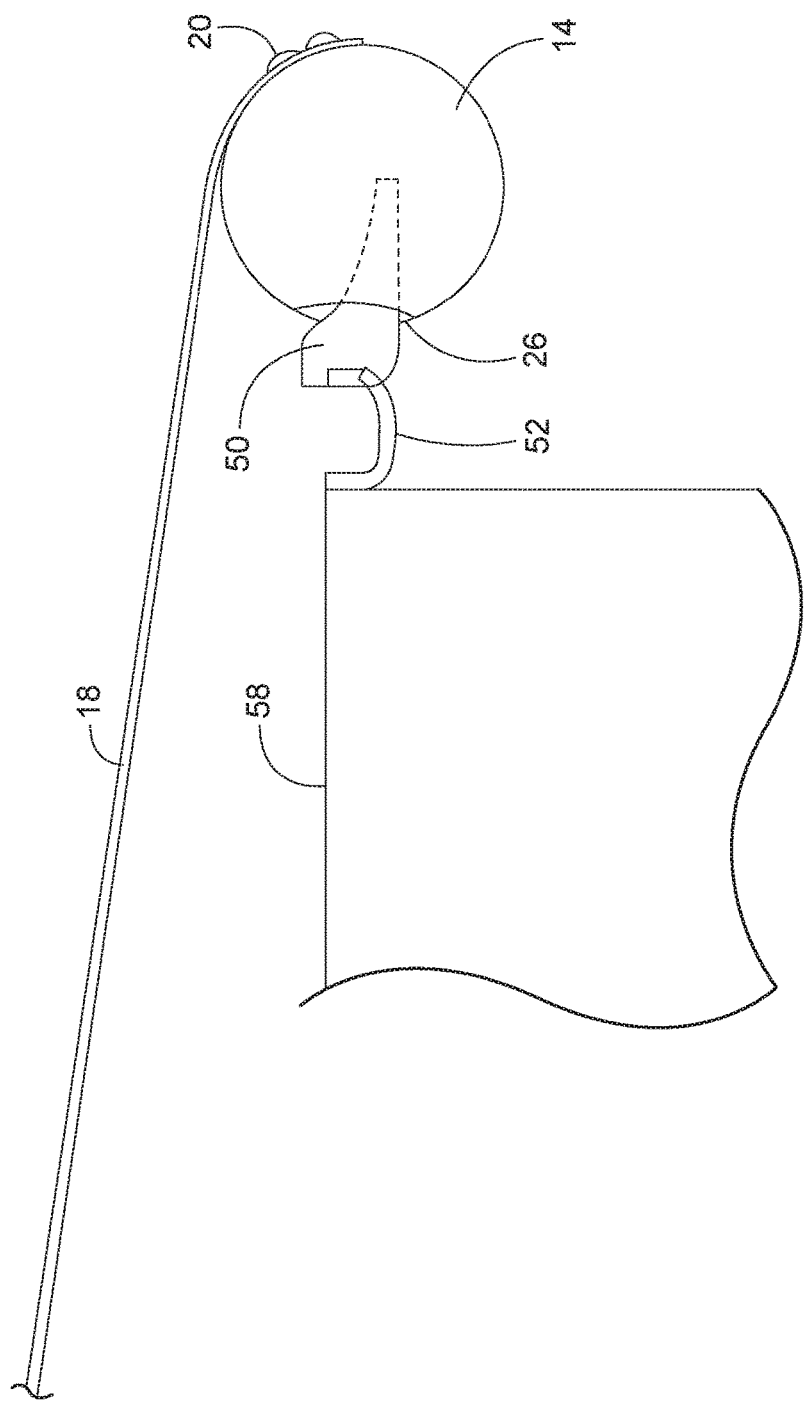

VEHICLE GUTTER SPOUT COVER

CROSS-REFERENCES

This patent application is a continuation of patent application Ser. No. 15/341,255, by Michael P. Hagen, entitled "VEHICLE GUTTER SPOUT COVER", filed on Nov. 2, 2016, the entire contents of which are fully incorporated by reference herein. Patent application Ser. No. 15/341,255 is a continuation of patent application Ser. No. 15/052,530, by Michael P. Hagen, entitled "VEHICLE GUTTER SPOUT COVER", filed on Feb. 24, 2016, the entire contents of which are fully incorporated by reference herein.

TECHNICAL FIELD

The present invention relates generally to gutter spout covers and more particularly to a gutter spout cover for a vehicle with gutters and spouts.

BACKGROUND

Recreational vehicles (RVs) and trailers are used by many people in the US and the world. In this document the term "RV" will include both recreational vehicles and trailers. Users often protect their RVs with covers. However, many RVs have gutters located on the vehicle. Many RVs with gutters use gutter spouts to direct the water or other liquids away from the RV. A problem arises in that these gutter spouts have relatively pointy and/or sharp ends and/or surfaces, and these ends or surfaces can cause damage to the covers used to protect the RV when the RV is parked or stored. Known solutions to prevent such tearing have many disadvantages. The known solutions are difficult to keep on the gutter spouts, or do not provide enough protection to the cover.

Therefore there is a need for a vehicle gutter spout cover that overcomes the above described and other disadvantages.

SUMMARY

The disclosed invention relates to a vehicle gutter spout cover comprising: a receptacle with a generally smooth outside surface; an orifice located on the receptacle and configured to allow the receptacle to slide over and enclose at least a portion of a gutter spout; and an adjustable length connecting means attached to the receptacle.

The invention also relates to a vehicle gutter spout cover system comprising: a vehicle; at least one gutter located on the vehicle; at least one gutter spout in fluid communication with the gutter; a receptacle with a generally smooth outside surface; an orifice located on the receptacle and configured to allow the receptacle to slide over and enclose at least a portion of the gutter spout; an adjustable length connecting means attached to the receptacle; and a vehicle cover configured to cover a vehicle and the gutter spout, with the receptacle generally enclosing at least a portion of the gutter spout.

BRIEF DESCRIPTION OF THE DRAWINGS

The present disclosure will be better understood by those skilled in the pertinent art by referencing the accompanying drawings, where like elements are numbered alike in the several figures, in which:

FIG. 8 is a cross-sectional view of the disclosed vehicle gutter spout cover installed on a gutter spout.

DETAILED DESCRIPTION

Figure 1:
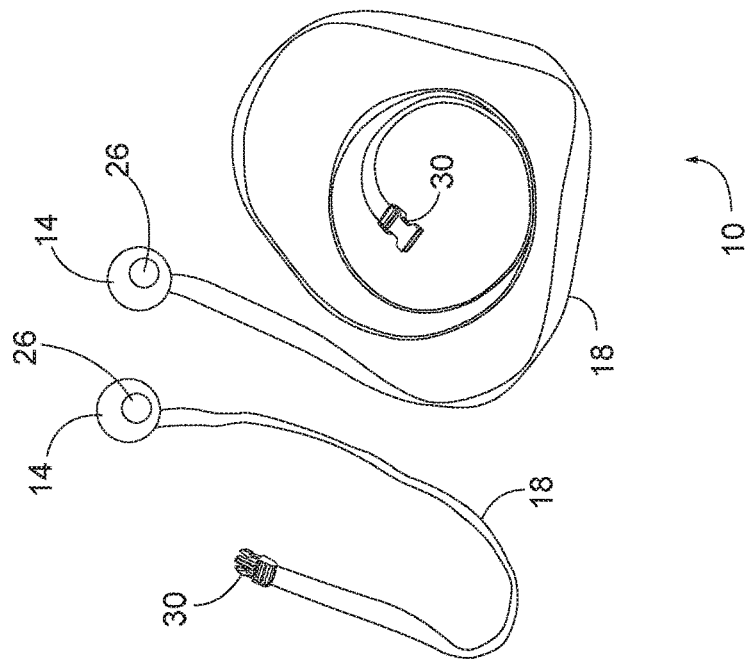
FIG. 1 is a top view of the disclosed vehicle gutter spout cover.

FIG. 1 shows a top view of one embodiment of the vehicle gutter spout cover 10. The vehicle gutter spout cover 10 comprises at least one receptacle 14. In addition there is a connecting means 18 attached to the receptacle 14 via an attachment means 20. The connecting means 18 may be any suitable connector, such as, but not limited to straps, ropes, cables, belts, etc. The connecting means 18 can have its length adjusted by using any suitable adjustment means, including but not limited to tri-glide buckles, strap ratchets, cam buckles, ladderlock buckles, side release buckles with a length adjustment means, etc. The attachment means 20 may be any suitable attachment means, including but not limited to rivets, nuts and bolts, adhesives, or castings into plastic, etc. In the embodiment shown in FIG. 1, the vehicle gutter spout cover 10 comprises two receptacles 14 attached to both ends of the connecting means 18. The receptacles 14 have a generally smooth outer surface 22. The smooth outer surface 22 is configured to generally prevent the surface 22 from damaging an RV cover that may be placed over the RV. In one embodiment, the receptacle may be spherical, but other shapes may be used so long as the outer surface 22 of the shape does not tend to damage an RV cover, such shapes may include, but are not limited to: semi-spherical shape, ellipsoid shape, cube shape with rounded corners, pyramid shape with rounded corners, etc. In one embodiment, the receptacles 14 may be tennis balls with an orifice cut into them. Each receptacle 14 also has an orifice 26. The orifice 26 is configured to be large enough to slide over a gutter spout, and configured so that the receptacle 14 generally encloses at least a portion of the gutter spout.

Figure 2:
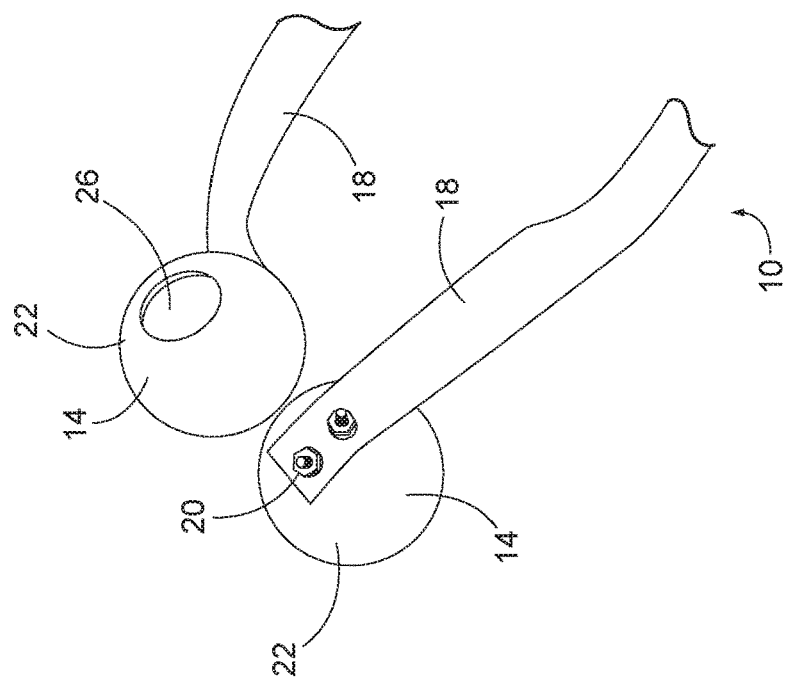
FIG. 2 is a top view of the vehicle gutter spout cover from FIG. 1 showing the two connecting means not connected.

FIG. 2 shows a top view of the vehicle gutter spout cover 10. In this embodiment, there are two receptacles 14. Note that both orifices 26 for each receptacle 14 are visible in this view. Also visible in this view are the buckles 30 on each connecting means 18.

Figure 3:
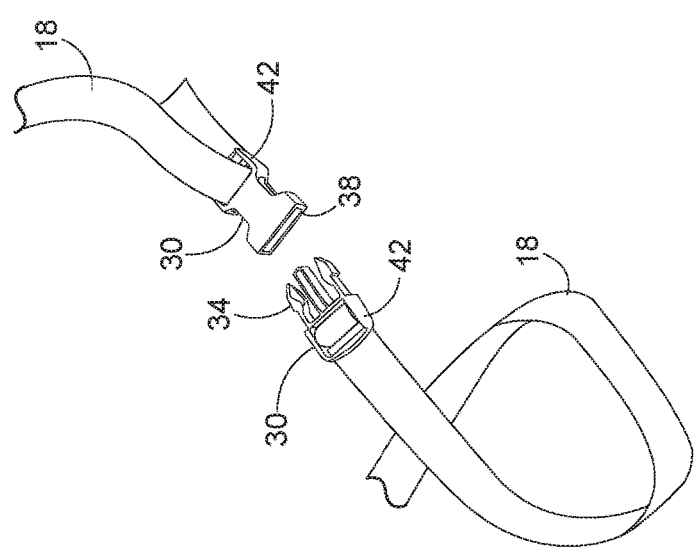
FIG. 3 is a close up view of the two connecting means of the disclosed vehicle gutter spout cover, showing the buckles.

FIG. 3 shows a close up of the buckles 30. The buckles 30 may be able to connect to each other, that is they may be side release buckles, in one embodiment. The buckles 30 allow both connecting means 18 to attach to each other, and the buckles 30 also allow for the connecting means 18 to be able to have its length adjusted. Thus one of the buckles may have prongs 34, and the other buckle may be the female receptacle 38. Both buckles 34, 38 will have length adjustment means 42.

Figure 4:
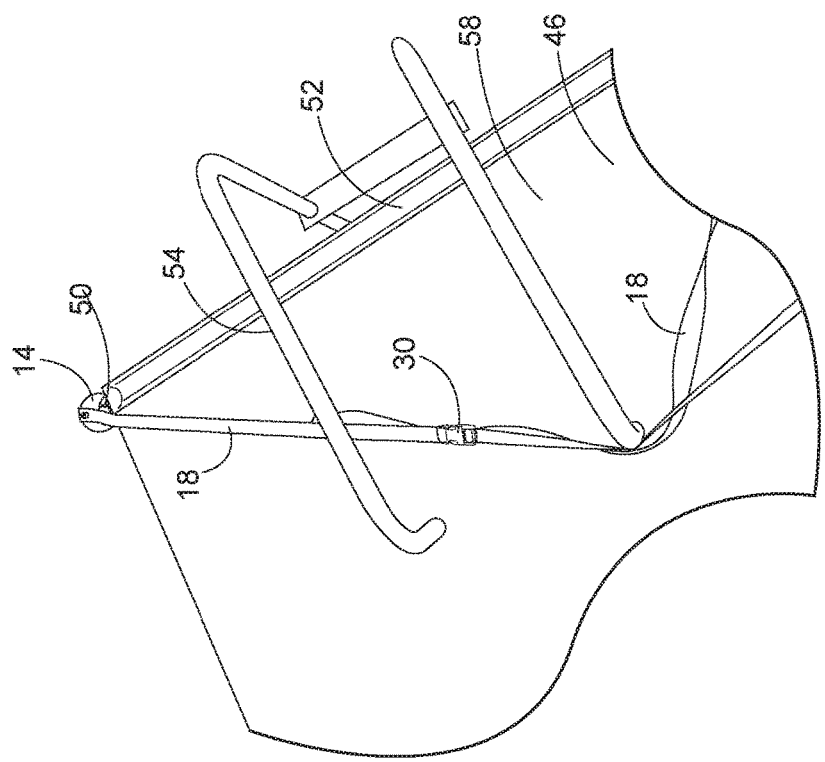
FIG. 4 is a perspective view of the disclosed vehicle gutter spout cover on an RV.

FIG. 4 shows the vehicle gutter spout cover 10 attached to the gutter spouts on an RV 46. In this embodiment, there are two receptacles 14, one on each end of the connecting means 18. Only one receptacle 14 is visible in this view. The receptacle has been slid over a gutter spout 50. The gutter spout 50 is in operable communication with an RV gutter (not visible in this view). The connecting means 18 has been threaded through an RV ladder 54 on the roof 58 of the RV 46. The other receptacle is also slid over another gutter spout on the RV 46. At this juncture, the connecting means 18 may have its length adjusted via the buckles 30, so that the connecting means are tightened such that the vehicle gutter spout cover 10 is securely attached to the gutter spouts 50.

Figure 5:
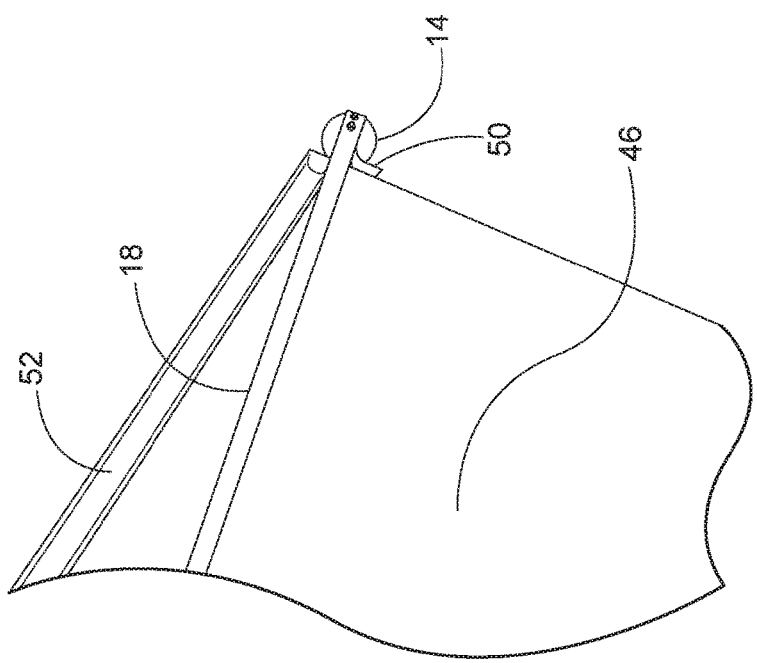
FIG. 5 is a close up view of one corner of an RV with the disclosed vehicle gutter spout cover.

FIG. 5 shows the other end of the connecting means 18 from FIG. 4, and the other receptacle 14 already slid over and onto another gutter spout 50. One can see that since the connecting means length has been shortened such that the connecting means 18 is now taut, the vehicle gutter spout cover 10 is securely fastened.

Figure 6:
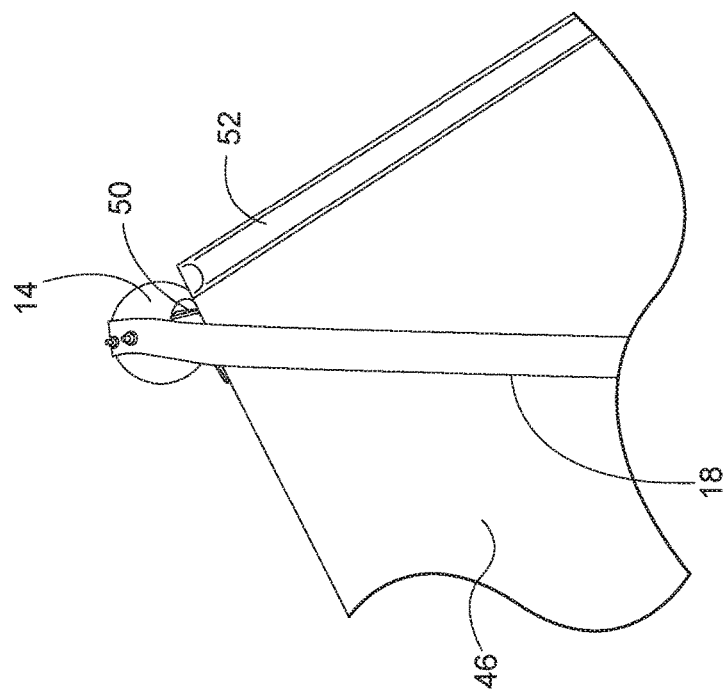
FIG. 6 is a close up view of another corner of an RV with the disclosed vehicle gutter spout cover.

FIG. 6 is a close up view of the receptacle 14 and gutter spout 50 from FIG. 4.

Figure 7:
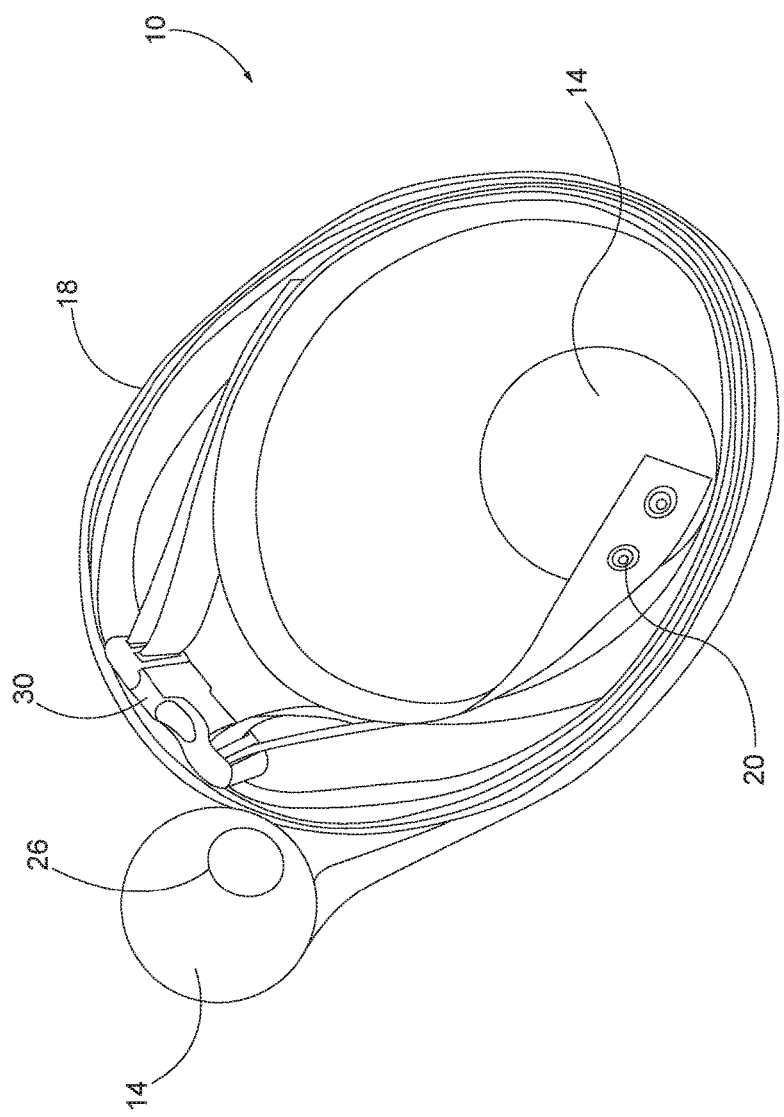
FIG. 7 is a close up view of the disclosed vehicle gutter spout cover.

FIG. 7 is another view of the vehicle gutter spout cover 10.

FIG. 8 shows a cross-sectional view of an RV 46 with a gutter 52 and a gutter spout 50 attached to the gutter. The receptacle 14 is shown slid over the gutter spout 50 via the orifice 26, with the connecting means 18 being generally taut and held in place by tension with the other receptacle 14 also installed on another gutter spout 50, which may be located on an opposite side of the RV 46. In other embodiments, instead of two receptacles 14 attached to a connecting means 18, there may be only one receptacle 14 attached to a connecting means, with a hook attached to the second end of the connecting means 18, thereby allowing one to simply attach the receptacle 14 to a gutter spout 50, and then attaching the other end of the connecting means to some structure on the RV via the hook.

In one embodiment, a method of manufacture would be a molded plastic end (receptacle) cast around a nylon strap (connecting means) with a quick connect, or at a minimum, cinching buckle to join the straps. One strap may be considerably longer (about 12 ft in one embodiment) and be placed over the gutter spout on one side, feeding the strap out as you work over to the opposite side, at which time you slide the cover over the second gutter and connect the two straps, removing any slack by adjusting the length of the straps and securing both ends in place.

The disclosed invention has many advantages. The vehicle gutter spout cover provides a rounded, smooth shape thereby preventing the pointed and abrasive nature of the end of the gutter spout from damaging RV covers. The vehicle gutter spout cover is easy to install and remove from gutter spouts, and the connecting means are easily adjustable in length. The receptacles may be light enough and soft enough that when one receptacle is slid over one gutter spout, the other receptacle (attached via the connecting means) can be thrown over to the other side of the RV, without fear of damaging the RV.

It should be noted that the terms "first", "second", and "third", and the like may be used herein to modify elements performing similar and/or analogous functions. These modifiers do not imply a spatial, sequential, or hierarchical order to the modified elements unless specifically stated.

While the disclosure has been described with reference to several embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiments disclosed as the best mode contemplated for carrying out this disclosure, but that the disclosure will include all embodiments falling within the scope of the appended claims.

What is claimed is:

1. A vehicle gutter spout cover comprising:
   a first receptacle with a generally smooth outside surface;
   a first orifice located on the first receptacle and configured to allow the first receptacle to slide over and enclose at least a portion of a gutter spout;
   an adjustable length connecting means permanently attached to the first receptacle, the adjustable length connecting means comprising:
      a first connector;
      a first connector length adjustment means attached to the first connector;
      a second connector attached to the first connector length adjustment means, and wherein the adjustable length connecting means is infinitely adjustable in length between a maximum length and minimum length;
   a second receptacle with a generally smooth outside surface;
   a second orifice located on the second receptacle and configured to allow the second receptacle to slide over and enclose at least a portion of a gutter spout, and the adjustable length connecting means permanently attached to the second receptacle, and
   wherein the adjustable length connecting means is configured to be tightened to securely attach the first receptacle and second receptacle to the gutter spouts.

2. The vehicle gutter spout cover of claim 1, wherein the first connector and second connector are selected from the group comprising ropes, cables, and belts.

3. A vehicle gutter spout cover system comprising:
   a vehicle;
   at least one gutter located on the vehicle;
   at least one gutter spout in fluid communication with the gutter;
   a first receptacle with a generally smooth outside surface;
   a first orifice located on the first receptacle and configured to allow the first receptacle to slide over and enclose at least a portion of the gutter spout;
   an adjustable length connecting means permanently attached to the first receptacle, the adjustable length connecting means comprising:
      a first connector;
      a first connector length adjustment means attached to the first connector;
      a second connector attached to the first connector length adjustment means, and
      wherein the adjustable length connecting means is infinitely adjustable in length between a maximum length and minimum length;
   a second receptacle with a generally smooth outside surface;
   a second orifice located on the second receptacle and configured to allow the second receptacle to slide over and enclose at least a portion of a second gutter spout on the vehicle; and
   wherein the second receptacle is permanently attached to the adjustable length connecting means; and a vehicle cover configured to cover a vehicle and the gutter spouts, with the first receptacle generally enclosing at least a portion of the gutter spout and with the second receptacle generally enclosing at least a portion of the second gutter spout; and wherein the adjustable length connecting means is configured to be tightened to securely attach the first receptacle and second receptacle to the gutter spouts.

4. The vehicle gutter spout cover of claim 3, wherein the first connector and second connector are selected from the group comprising ropes, cables, and belts.

* * * * *